United States Patent
Lee

(10) Patent No.: US 8,651,558 B2
(45) Date of Patent: Feb. 18, 2014

(54) STIFFENER FOR VEHICLE

(75) Inventor: Jeong Ho Lee, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 325 days.

(21) Appl. No.: 12/952,813

(22) Filed: Nov. 23, 2010

(65) Prior Publication Data
US 2011/0127798 A1    Jun. 2, 2011

(30) Foreign Application Priority Data
Nov. 27, 2009   (KR) .................. 10-2009-0115819

(51) Int. Cl.
- *B60R 19/26*  (2006.01)
- *B60R 19/18*  (2006.01)
- *B60J 7/00*   (2006.01)

(52) U.S. Cl.
USPC ............. 296/187.04; 296/187.03; 296/187.09

(58) Field of Classification Search
USPC ......... 293/155, 110, 133, 102, 121, 109, 120; 188/371–377; 296/187.04, 187.03
See application file for complete search history.

(56) References Cited

U.S. PATENT DOCUMENTS

| | | | | |
|---|---|---|---|---|
| 5,178,425 A | * | 1/1993 | Kumagai et al. | 293/120 |
| 5,988,713 A | * | 11/1999 | Okamura et al. | 293/120 |
| 6,681,876 B1 | * | 1/2004 | Haneda et al. | 180/68.4 |
| 7,410,018 B2 | * | 8/2008 | Satou | 180/68.4 |
| 7,438,348 B2 | * | 10/2008 | Nakamae et al. | 296/187.04 |
| 7,597,383 B2 | * | 10/2009 | Itou et al. | 296/187.04 |
| 7,661,735 B2 | * | 2/2010 | Roussel et al. | 293/120 |
| 2007/0182171 A1 | * | 8/2007 | Kageyama et al. | 293/102 |
| 2010/0259033 A1 | * | 10/2010 | Okabe et al. | 280/734 |

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A stiffener for a vehicle, may include a coupling stiffener part, an upper stiffener part extending integrally from an upper end of the coupling stiffener part, and protruding to a forward direction of the vehicle with a predetermined length, and a lower stiffener part extending integrally from a lower end of the coupling stiffener part, and protruding to the forward direction of the vehicle, with a predetermined length, wherein the coupling stiffener is secured to a bumper back beam, and wherein the upper stiffener part and the lower stiffener part are complementarily operated about the coupling stiffener part serving as a support shaft in a seesaw type manner to absorb shocks, in the event of a collision between the vehicle and a pedestrian.

8 Claims, 5 Drawing Sheets front → rear

STIFFENER FOR VEHICLE

The present application claims priority to Korean Patent Application No. 10-2009-0115819, filed on Nov. 27, 2009, the entire contents of which is incorporated herein for all purposes by this reference.

BACKGROUND OF THE INVENTION

1. Field of the Invention

The present invention relates generally to a stiffener for a vehicle and, more particularly, to a stiffener for a vehicle, which is constructed so that an upper stiffener part and a lower stiffener part are integrated with each other, thus absorbing shocks at upper and lower parts in the event of a collision between a vehicle and a pedestrian.

2. Description of Related Art

Generally, a back beam is coupled to a carrier of a vehicle to mount a bumper, and a stiffener is mounted to a lower member of the carrier so as to prevent a portion under a pedestrian's knee from entering under a vehicle.

As shown in FIG. 4, a back beam 20 is provided on the central portion of a carrier 10 so that a bumper is mounted to the back beam 20, and is coupled to side panels 12 of the carrier 10. The back beam 20 is coupled to the side panels 12 by fastening back beam stays 22, provided on opposite side ends of the back beam 20, to the side panels 12 using bolts.

Further, a stiffener 30 is provided under the back beam 20 in such a way as to be coupled to a lower member 15 of the carrier 10. The stiffener 30 has the shape of a panel. The stiffener 30 is coupled at its part having a narrow area to the lower member 15 of the carrier 10, and protrudes forwards from the carrier 10, thus blocking the lower portion of the carrier 10.

However, the conventional stiffener is problematic in that pressure generated by a vehicle collision is concentrated on a portion under a pedestrian's knee, so that his or her injury is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a stiffener for a vehicle, which absorbs shocks acting on the upper and lower portions of a pedestrian's leg in the event of a collision between the vehicle and the pedestrian, thus reducing the extent of injury to the pedestrian when he or she collides with the vehicle.

In an aspect of the present invention, the stiffener for a vehicle, may include a coupling stiffener part, an upper stiffener part extending integrally from an upper end of the coupling stiffener part, and protruding to a forward direction of the vehicle with a predetermined length, and a lower stiffener part extending integrally from a lower end of the coupling stiffener part, and protruding to the forward direction of the vehicle, with a predetermined length, wherein the coupling stiffener is secured to a bumper back beam, and wherein the upper stiffener part and the lower stiffener part are complementarily operated about the coupling stiffener part serving as a support shaft in a pivotal type manner to absorb shocks, in the event of a collision between the vehicle and a pedestrian.

The coupling stiffener part, the upper stiffener part and the lower stiffener part may be formed monolithically.

Each of the coupling stiffener part, the upper stiffener part and the lower stiffener part may be made of a glass mat reinforced thermoplastics (GMT) material.

The coupling stiffener part may enclose a front portion of the bumper back beam.

The coupling stiffener part may include a bent part which is bent to the forward direction of the vehicle along a longitudinal direction of the bumper back bean to correspond to a shape of the front portion of the bumper back beam, wherein a mounting recess is provided in each of upper and lower portions of the coupling stiffener part in such a way as to be bent to the forward direction of the vehicle, each of upper and lower portions of a mounting bracket being seated in the mounting recess while the bent part receives the bumper back beam.

A mounting bracket may be provided on a rear portion of the bumper back beam and fastened to upper and lower portions of the coupling stiffener part via a fastening member, wherein the mounting bracket forms a plate-shaped section along with the upper stiffener part and the lower stiffener part, and wherein a mounting recess is provided in each of upper and lower portions of the coupling stiffener part in such a way as to be bent to the forward direction of the vehicle, each of upper and lower portions of the mounting bracket being seated in the mounting recess.

As is apparent from the above description, a stiffener for a vehicle according to the present invention is advantageous in that the stiffener protrudes from the upper and lower portions of a bumper back beam, so that the upper and lower parts of the stiffener complementarily move in a pivotal type manner to absorb shocks in the event of a collision between a vehicle and a pedestrian, thus decreasing the extent of injury to a pedestrian.

Further, a stiffener for a vehicle according to the present invention is advantageous in that the stiffener protruding from the upper and lower portions of a bumper back beam has an integrated structure, so that manufacturing cost and weight thereof are reduced, and the number of portions which are to be assembled is reduced. As such, the stiffener is advantageous in terms of processing.

Further, a stiffener for a vehicle according to the present invention is advantageous in that it is made of a glass mat reinforced thermoplastics (GMT) material and has a plate-shaped section, so that it is possible to attain a stable evaluation score in a collision test, and performance satisfying regulations concerning marketability is achieved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
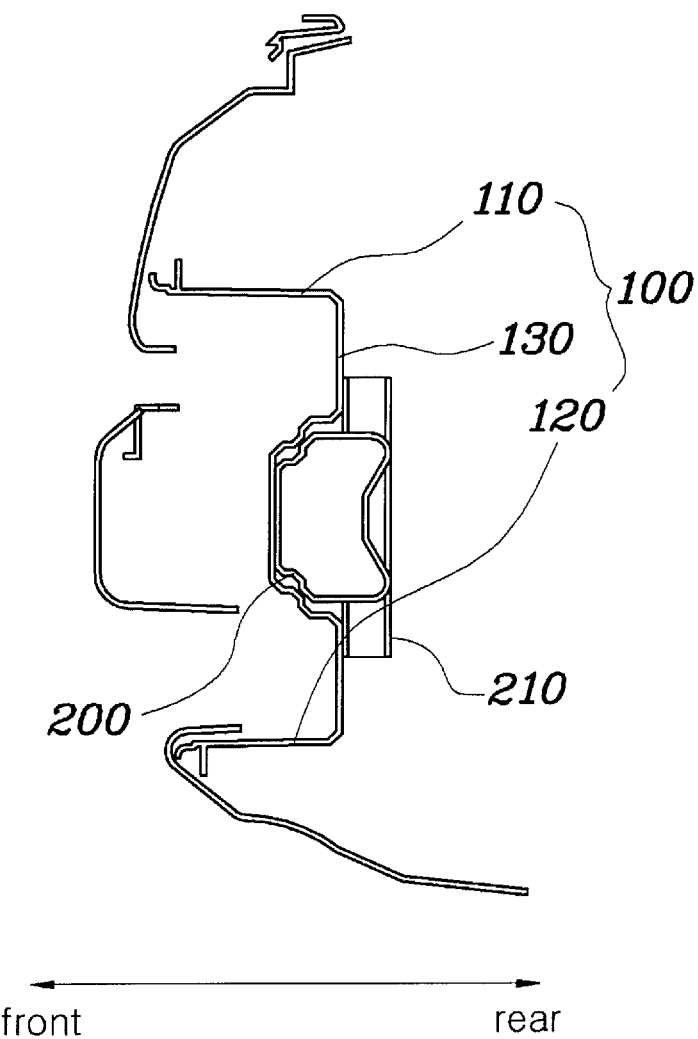
FIG. 1 is a side sectional view illustrating an exemplary stiffener for a vehicle, according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a stiffener for a vehicle according to an embodiment of the present invention will be described in detail with reference to the accompanying drawings.

Figure 2A:
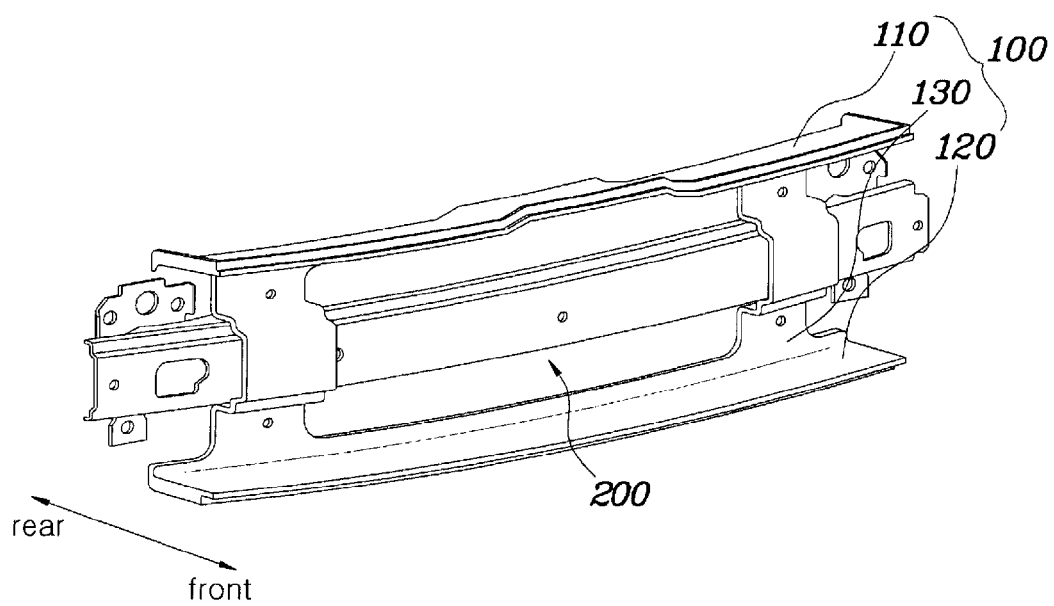
FIG. 2A is a perspective view illustrating the front of the exemplary stiffener for the vehicle according to the present invention, with a bumper back beam being coupled to the stiffener.
Figure 2B:
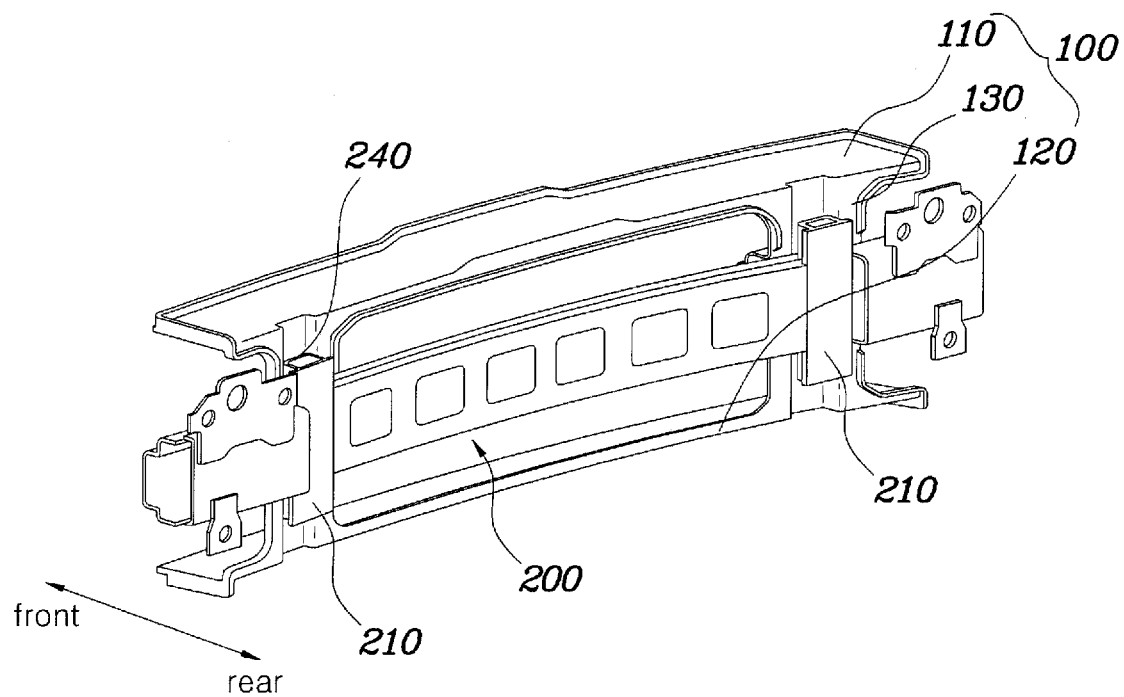
FIG. 2B is a perspective view illustrating the back of the exemplary stiffener for the vehicle according to the present invention, with the bumper back beam being coupled to the stiffener.
Figure 3:
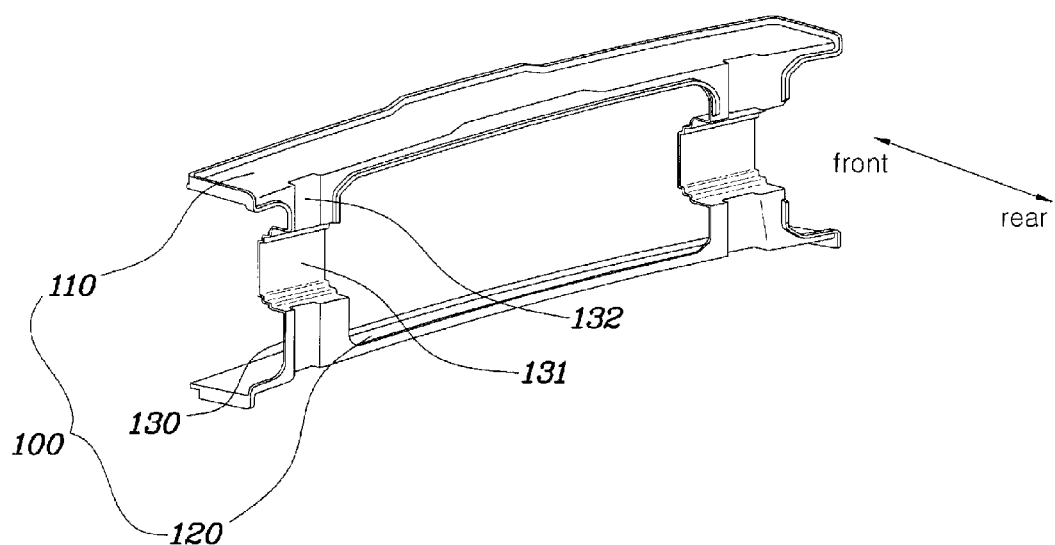
FIG. 3 is a perspective view illustrating the exemplary stiffener for the vehicle, according to the present invention.
Figure 4:
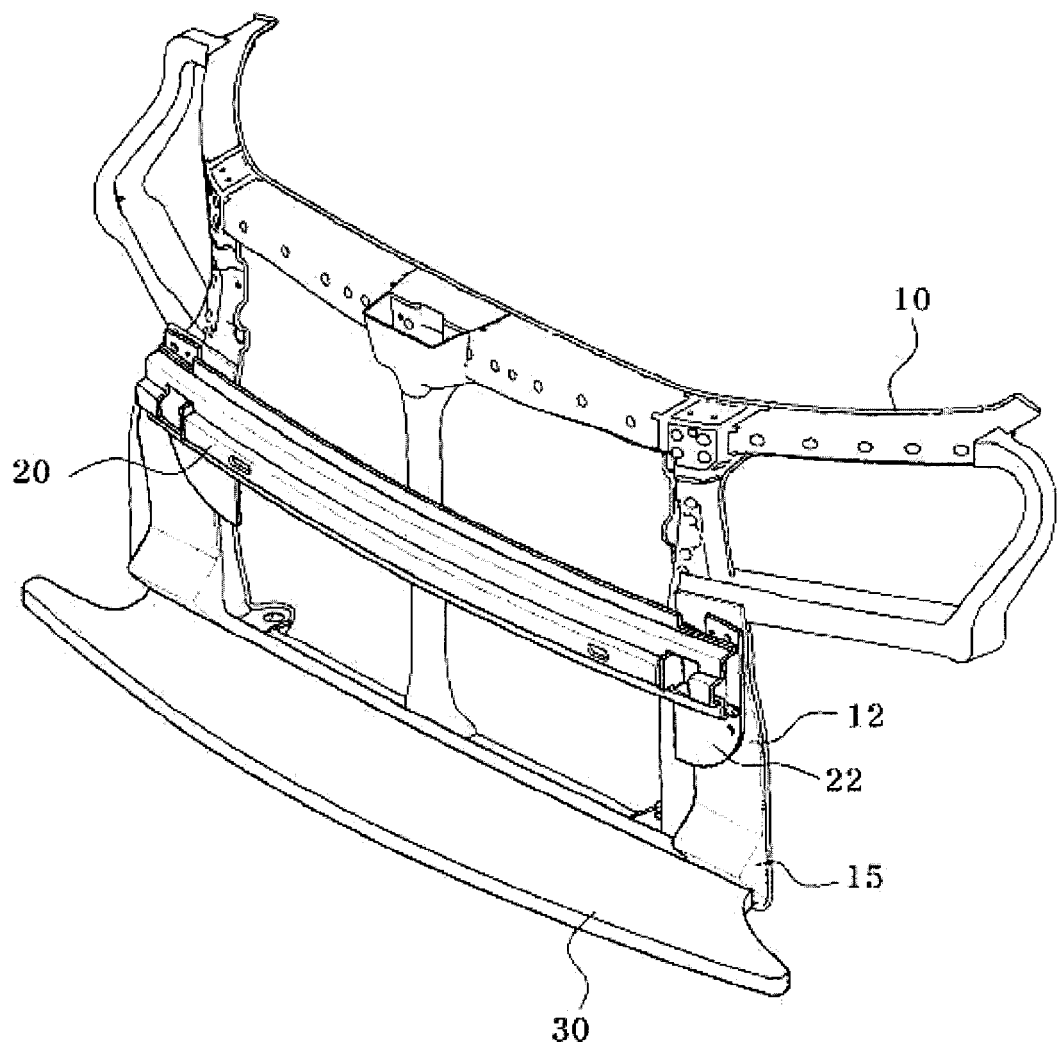
FIG. 4 is a view illustrating the construction of a conventional stiffener for a vehicle.

As shown in FIGS. 1 to 3, a stiffener 100 according to an exemplary embodiment of the present invention is constructed so that an upper stiffener part 110 and a lower stiffener part 120 are integrated with each other. Thus, the upper and lower parts of the stiffener 100 are complementarily operated in a pivotal type manner in the event of a collision between a vehicle and a pedestrian, thus reducing the injury of the pedestrian when he or she collides with the vehicle.

In detail, the stiffener 100 includes the upper stiffener part 110 which is placed above a bumper back beam 200, the lower stiffener part 120 which is placed under the bumper back beam 200, and a coupling stiffener part 130 which integrally couples the upper stiffener part 110 with the lower stiffener part 120.

The upper and lower stiffener parts 110 and 120 are placed, respectively, above and under the bumper back beam 200, in such a way as to protrude to the front of the vehicle, and are complementarily operated to absorb shocks. The upper and lower stiffener parts 110 and 120 are integrally coupled with each other via the coupling stiffener part 130.

The coupling stiffener part 130 functions to couple the upper and lower stiffener parts 110 and 120 with each other in a vertical direction. The coupling stiffener part 130, the upper stiffener part 110 and the lower stiffener part 120 may be manufactured by a general injection molding process to be monolithically integrated into the stiffener 100.

The stiffener 100 including the coupling stiffener part 130 is fastened to the bumper back beam 200 via mounting brackets 210. Here, each mounting bracket 210 is secured at a predetermined position to the bumper back beam 200 by welding. The mounting bracket 210 which is secured in this way fastens the stiffener 100 to the bumper back beam 200 via a fastening means such as a bolt.

Particularly, in order to effectively couple the stiffener 100 with the bumper back beam 200, mounting recesses 132 may be formed in the coupling stiffener part 130 in a vertical direction so that the upper and lower portions of the mounting bracket 210 are seated in the corresponding mounting recesses 132. The mounting bracket 210 is inserted into the mounting recesses 132 and then fastened to the mounting recesses 132 via bolts, thus preventing the mounting bracket 210 from moving to the side of the vehicle.

Further, a bent part 131 may be formed in the coupling stiffener part 130 such that the bumper back beam 200 is seated in the bent part 131. The bent part 131 is bent in a side section thereof in the 'U' shape in a horizontal direction to correspond to the shape of the front of the bumper back beam 200. Thus, the stiffener 100 coupled to the bumper back beam 200 via the bent part 131 can be prevented from moving in a vertical direction.

That is, the stiffener 100 is coupled to the front of the bumper back beam 200 via the bent part 131. After each mounting bracket 210 is placed on the back of the bumper back beam 200, the mounting bracket 210 is inserted into the mounting recesses 132 of the stiffener 100. In such a state, the mounting bracket 210 is fastened to the mounting recesses 132 via bolts. Therefore, the stiffener 100 is firmly coupled with the bumper back beam 200.

As described above, the stiffener for the vehicle according to an exemplary embodiment of the present invention is constructed so that the upper stiffener part 110 and the lower stiffener part 120 are integrated with each other. Thus, in the event of a collision between a vehicle and a pedestrian, the upper and lower stiffener parts 110 and 120 may be complementarily operated about the coupling stiffener part 130 serving as a support shaft in a pivotal type manner, thus absorbing shocks.

For example, when the pedestrian's leg collides with the lower stiffener part 120 in the event of a vehicle collision, the upper stiffener part 110 and the lower stiffener part 120 are integrated with each other, so that the lower stiffener part 120 is pushed to the back of the vehicle because of the shocks caused by the collision, whereas the upper stiffener part 110 protrudes to the front of the vehicle. Consequently, such an operation of the stiffener 100 allows the upper and lower parts of the stiffener 100 to be complementarily moved and absorb shocks, thus reducing the pedestrian's injury in the event of the vehicle collision.

In an exemplary embodiment of the present invention, the coupling stiffener part 120, the upper stiffener part 110 and the lower stiffener part 120 may be made of a glass mat reinforced thermoplastics (GMT) material.

The mounting bracket 210 may form a plate-shaped section 240 along with the upper stiffener part and the lower stiffener part.

Meanwhile, the upper stiffener part 110 placed above the bumper back beam 200 and the lower stiffener part 120 placed under the bumper back beam 200 may be separately manufactured and welded later therebetween to form a single body.

Therefore, as in the present invention, the upper stiffener part 110 and the lower stiffener part 120 are integrated with each other, so that the upper and lower parts of the stiffener 100 are complementarily operated in a pivotal type manner to absorb shocks in the event of a collision between a vehicle and a pedestrian.

For convenience in explanation and accurate definition in the appended claims, the terms "upper", "lower", "inner", "outer", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A stiffener for a vehicle, comprising:
   a coupling stiffener part;
   an upper stiffener part extending integrally from an upper end of the coupling stiffener part, and protruding to a forward direction of the vehicle with a predetermined length; and
   a lower stiffener part extending integrally from a lower end of the coupling stiffener part, and protruding to the forward direction of the vehicle, with a predetermined length,
   wherein the coupling stiffener part is seated onto a front portion, an upper portion and a lower portion of a bumper back beam, and
   wherein the upper stiffener part and the lower stiffener part are complementarily pivotable with the coupling stiffener part about the bumper back beam to absorb and redirect shock in the event of a collision between the vehicle and a pedestrian.

2. The stiffener as set forth in claim 1, wherein the coupling stiffener part, the upper stiffener part and the lower stiffener part are formed monolithically.

3. The stiffener as set forth in claim 1, wherein each of the coupling stiffener part, the upper stiffener part and the lower stiffener part is made of a glass mat reinforced thermoplastics (GMT) material.

4. The stiffener as set forth in claim 1, wherein the coupling stiffener part comprises a bent part which is bent to the forward direction of the vehicle along a longitudinal direction of the bumper back beam to correspond to a shape of the front portion of the bumper back beam.

5. The stiffener as set forth in claim 4, wherein a mounting recess is provided in each of upper and lower portions of the coupling stiffener part in such a way as to be bent to the forward direction of the vehicle, each of upper and lower portions of a mounting bracket being seated in the mounting recess while the bent part receives the bumper back beam.

6. The stiffener as set forth in claim 1, wherein a mounting bracket is provided on a rear portion of the bumper back beam and fastened to upper and lower portions of the coupling stiffener part via a fastening member.

7. The stiffener as set forth in claim 6, wherein the mounting bracket forms a plate-shaped section along with the upper stiffener part and the lower stiffener part.

8. The stiffener as set forth in claim 6, wherein a mounting recess is provided in each of upper and lower portions of the coupling stiffener part in such a way as to be bent to the forward direction of the vehicle, each of upper and lower portions of the mounting bracket being seated in the mounting recess.

* * * * *